United States Patent [19]

Rangabe

[11] 4,449,214
[45] May 15, 1984

[54] RECORD CLEANING MECHANISM

[76] Inventor: Alexander R. Rangabe, Stoneacre, Denmead, Portsmouth, England

[21] Appl. No.: 303,709

[22] Filed: Sep. 18, 1981

[30] Foreign Application Priority Data

Sep. 26, 1980 [GB] United Kingdom ............... 8031131

[51] Int. Cl.³ .............................................. G11B 3/58
[52] U.S. Cl. .................................................... 369/72
[58] Field of Search .................... 369/71, 72, 73, 74, 369/244

[56] References Cited

U.S. PATENT DOCUMENTS

| | | | |
|---|---|---|---|
| 3,355,177 | 11/1967 | King | 369/72 |
| 4,070,028 | 1/1978 | Wilson | 369/72 |
| 4,082,294 | 4/1978 | Myers et al. | 369/72 |
| 4,173,348 | 11/1979 | Dholakia | 369/72 |

FOREIGN PATENT DOCUMENTS 49095 4/1982 European Pat. Off. ............. 369/72

*Primary Examiner*—Steven L. Stephan
*Attorney, Agent, or Firm*—Browdy and Neimark

[57] ABSTRACT

A cleaning mechanism for phonograph disc records includes a probe, and preferably a pluarality of probes arranged in line abreast relative to the direction of record rotation, for engagement within the record groove to remove particulate matter entrained therein. Previously cleaners have been brushes with fibres which inefficiently trail along the record surface. The probes maintain a bulldozing cleaning action and are preferably wire having a tip part inclined at about 90° to a mounting part which is held in a carrier over the record. The carrier has means for dry cleaning such as a pad to pick up particles, or for wet cleaning including a liquid reservoir and dispensing means supported therefrom suitably from a pivoted arm. The carrier may be supported from a radially extending beam or a pivoted arm disposed in a leading attitude, in a manner permitting tracking by the probes of the record groove.

20 Claims, 12 Drawing Figures

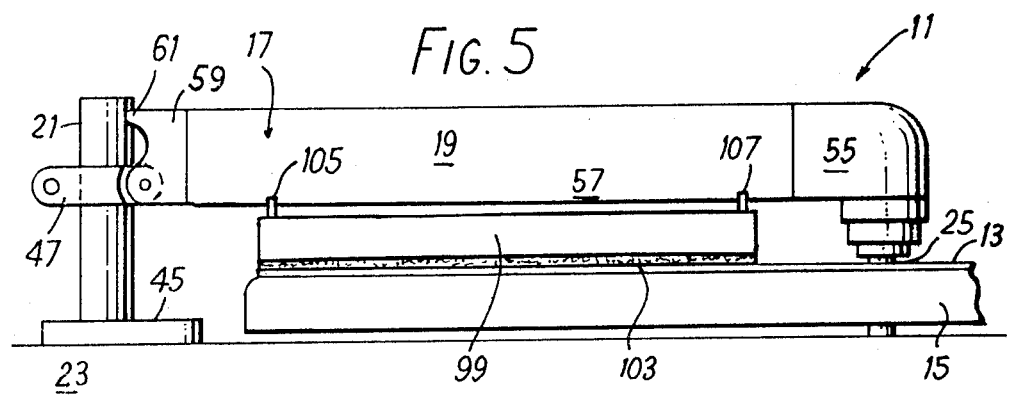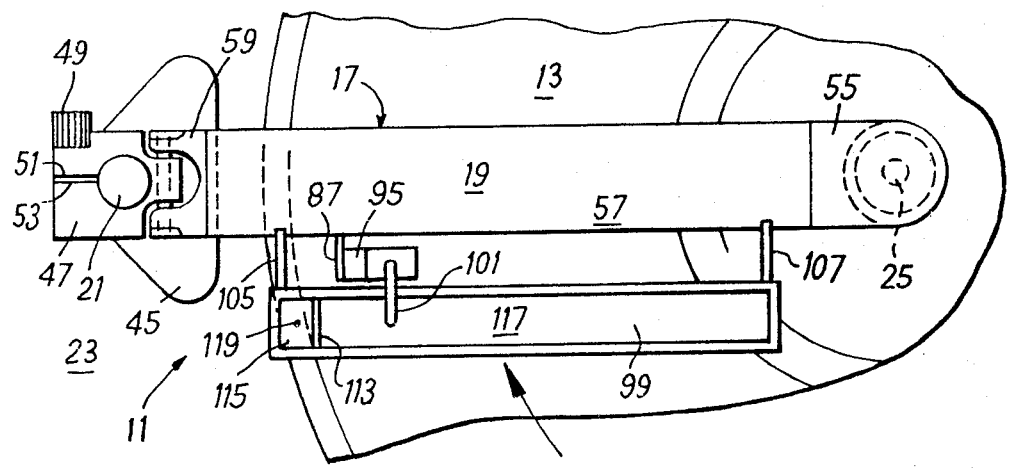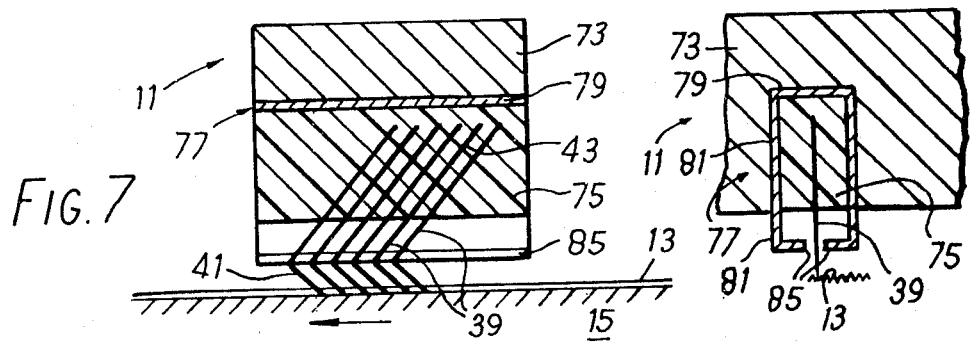

RECORD CLEANING MECHANISM

This invention relates to cleaning mechanism for phonograph disc records. Most of the "clicks" and "pops" heard during the playing of a phonograph disc record are caused by particulate matter lodged in the bottom of the record groove or trace, some of the offending particles being embedded in solid deposits of mould release lubricant used during record manufacture. A variety of mechanical cleaning devices have hitherto been proposed which include brush or brush-like devices having brushing fibres which enter the record groove but owing to the high compliance of the fibres have the effect, if any, in the case where the fibres are in a trailing attitude with respect to the sense of record rotation of pressing particulate matter into the bottom of the grooves thereby aggravating the problem of removing such matter from the grooves whilst in the case where the fibres are in a leading attitude with respect to the sense of record rotation, the compliance of the fibres has the effect that when the tips thereof engage firmly lodged particles, the fibres tend to be deflected over those particles leaving them undisturbed.

It is an object of the present invention to provide improved cleaning mechanism for phonograph disc records in the use of which the problems referred to are largely, if not wholly, overcome.

The present invention consists in cleaning mechanism for phonograph disc records, comprising a carrier, support means for positioning the carrier over a disc record groove when the latter is in operative location on a turntable and adapted to enable movement of the carrier in said operative location of the record in a direction generally towards the axis of rotation of the record, and a probe mounted on the carrier and having a tip which engages within the record groove at or substantially at the bottom of the groove, the tip being inclined relatively to the record with respect to the direction of travel of the point on the record engaged by the probe tip at an acute angle so as to maintain during rotation of the record a bulldozing action to raise noise inducing particles out of the record groove.

Preferably, the probe tip is inclined relatively to the record in the direction of travel thereof at the point of contact with the probe at an acute angle in the range 25° to 65°.

Advantageously the acute angle is in the range 35° to 45°.

In one embodiment, the carrier comprises a member slidable in said generally radial direction relative to the axis of record rotation and an arm pivotally supported at one end thereof from said member, the arm being disposed with its longitudinal axis extending generally radially with respect to said axis of rotation and with the or each probe mounted at the free end thereof.

Suitably, there are provided a plurality of probes mounted on the carrier. Advantageously, the probes are disposed in line astern, or alternatively the probes are disposed in line abreast.

In a preferred form the or each probe comprises a wire element having a tip part for engaging the record groove and a mounting part extending from the tip part and supported in the carrier at a location remote from said tip part, the mounting part and the tip part being mutually inclined so that, in operation, with respect to the direction of motion of the point of the record in engagement with the probe, the mounting part is in a trailing attitude whilst the tip part is at an acute angle. Suitably, the mounting and tip parts are mutually inclined at an angle of 90°.

By providing a bulldozing action of the probe tip or tips in the record groove, the cleaning mechanism of the invention enables removal of particulate matter lodged in the groove. As hereinafter described, by applying suitable liquid to the surface of the record in advance of the engagement thereof with the probe tip, even particles embedded in solid deposits in the groove in the material of the record can be dislodged from the groove.

The invention will now be described, by way of example, with reference to the accompanying drawings in which:

FIGS. 5 & 6 are respectively a side elevation and a plan view of the mechanism of the preceding figures, including the means for wet cleaning of FIG. 3;

FIG. 7 is a sectional elevation of a detail of the mechanism of the preceding figures;

FIG. 8 is a sectional elevation of the part of the mechanism shown in FIG. 7, taken in a direction normal to the section of FIG. 7;

Figure 1:
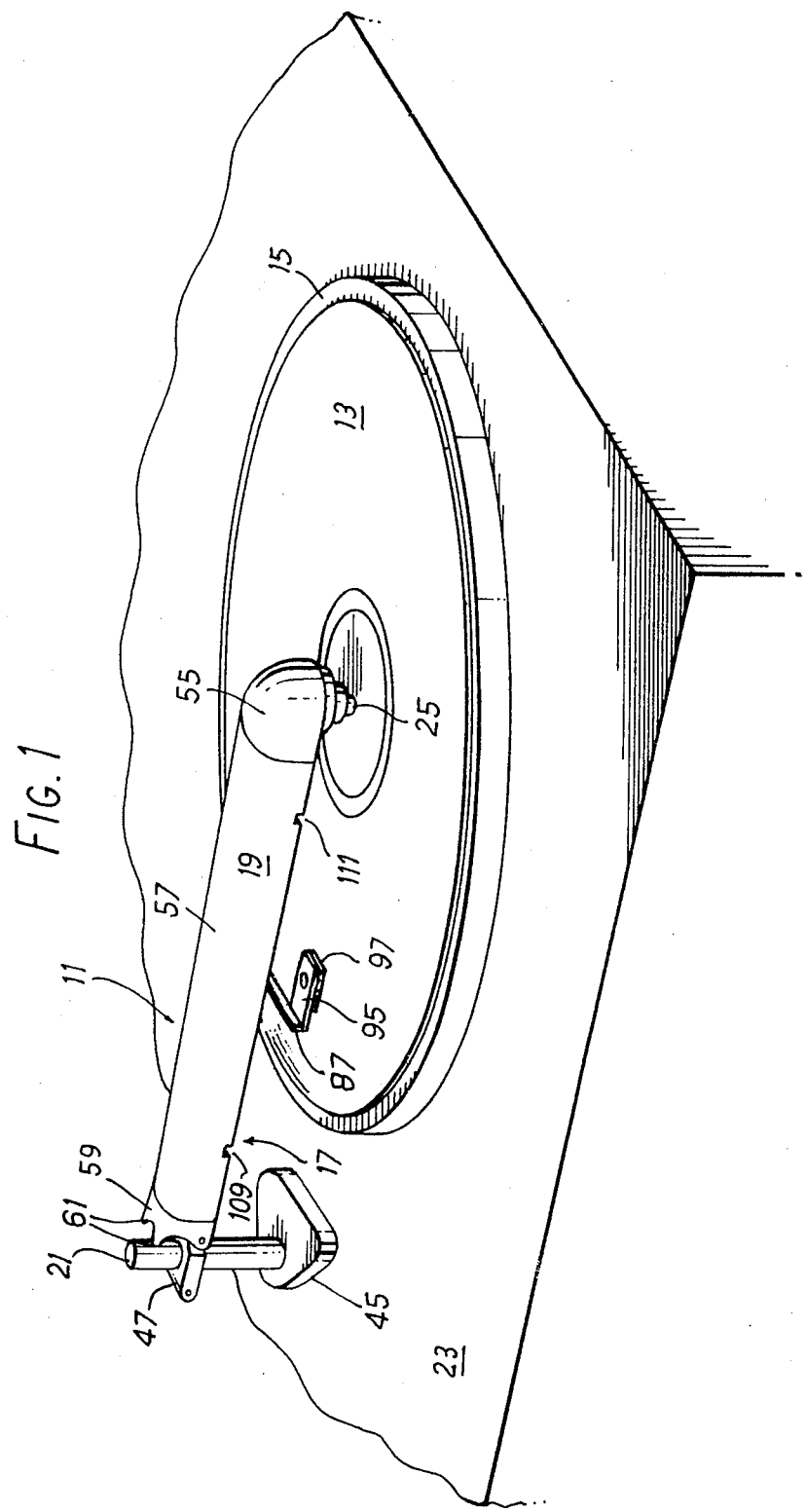
FIG. 1 is a perspective view of one embodiment of a cleaning mechanism for phonograph disc records according to the invention, without means for wet cleaning.

Referring to FIGS. 1 to 8, there is illustrated an embodiment of a cleaning mechanism, generally indicated by the number 11, for cleaning a phonograph disc record 13 on a turntable 15. The cleaning mechanism comprises a support means 17 which has a beam 19 pivotally mounted at an outer end thereof on a post 21 carried on a baseboard 23 of the turntable 15. In operation, the inner end of the beam is supported as shown in the Figures on an upright stud 25 at the centre of the turntable. Beam 19 is of inverted channel section having facing, longitudinally extending grooves 27, 29 formed in the sides of the channel. These grooves support a carrier, generally indicated by 31, which in use is located over the the disc record groove, and which is slidable relatively to and longitudinally of the beam 19, that is, in a direction radially with respect to the axis of rotation of the record.

Carrier 31 comprises a slide member 33, located to engage the grooves 27, 29 of the beam, and an arm 35, pivotally supported at one end thereof from slide 33 on a pin 37, and extending beneath the beam with its longitudinal axis generally parallel the axis of the channel. At the free end of the arm is mounted a series of probes 39, each probe having a tip part 41 and a mounting part 43, with the tip in operation being engaged within the record groove. Each tip part is inclined relatively to the record with respect to the direction of travel of the point on the record engaged by the probe tip at an acute angle so as to maintain during rotation of the record a bulldozing action to raise noise inducing particles out of the record groove.

Details of the mounting of the support means 17 are shown in FIGS. 1, 5 and 6. A triangular plate 45 is fixed to the baseboard 23 adjacent the turntable 15 and post 21, secured in relation to the plate, extends in a vertical direction, normal to the plane of the baseboard. There is provided on the post a clamp member 47 movable up and down the post when screw 49 is loosened to permit separation of facing sides 51 and 53 on the member 47. To lock the clamp member in a desired position the screw is tightened to bring the two surfaces together so that the member grips the post. Beam 19 is formed in three parts: an inner end part 55 which in the operative position shown is held to cover the free end of stud 25; a central portion 57 forming the main part of the grooved channel; and an end portion 59 which is pivotally attached to the adjustable clamp member to be rotatable about an axis parallel to the record surface so that the beam can be rotated through 45° to permit the record to be changed or turned over. On end portion 59 the two free corners facing post 21 have flexible resilient extensions 61 which in the raised position resiliently embrace the free end of the post to prevent the beam from falling back on the record. The three sections can cheaply and easily be separately moulded from plastics material, for example, and snapped together to form a complete beam.

Figure 2:
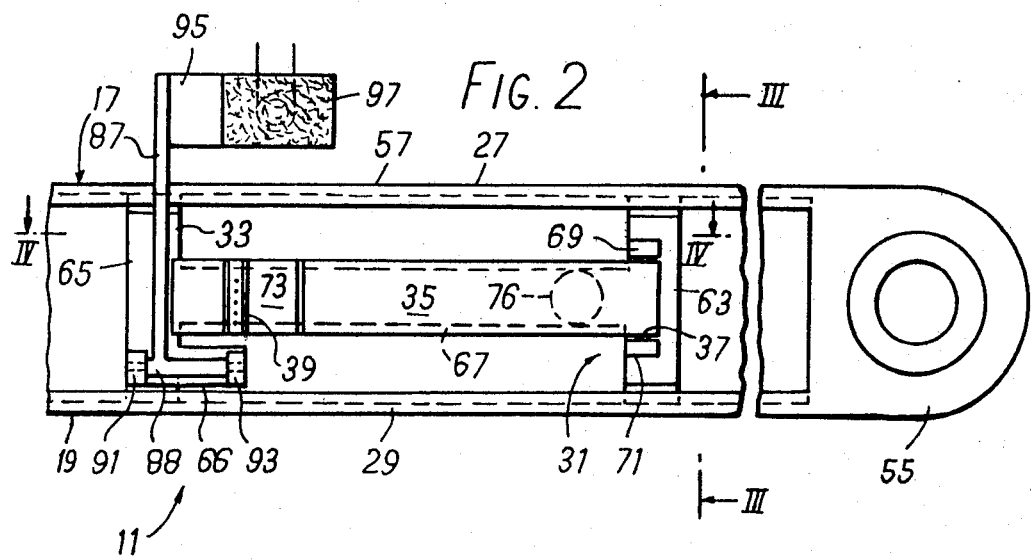
FIG. 2 is a fragmentary, underneath plan view of the mechanism of FIG. 1.
Figure 3:
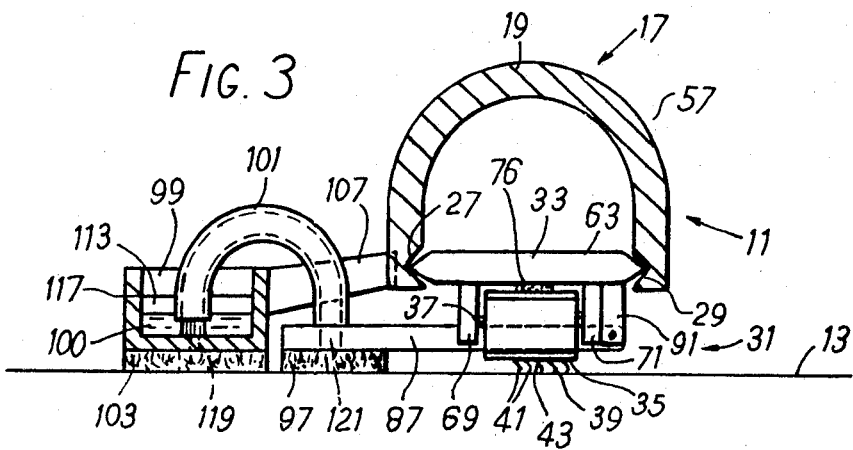
FIGS. 3 & 4 are sectional views on the lines III—III and IV—IV respectively of FIG. 2, FIG. 3 including means for wet cleaning.

In FIG. 2 (which is an underside view) and FIGS. 3, 4, 7 and 8, the carrier 31 and probes 39 can be seen. Carrier 31 comprises the slide member 33 which is generally 'H'-shaped, having two parallel legs 63, 65 and a connecting bar 67. The free ends of each leg are formed with 'V'-shaped ridges which engage in the grooves 27, 29 in the beam. Leg 63 at the radially inner end of the beam in the operating position of the mechanism has two bearing mountings 69, 71 on respective sides of bar 67 and extending in a direction towards the record surface. Pin 37 is fixed between the mountings and pivotally supports arm 35 for rotation about an axis parallel to the leg 63. Arm 35 extends between bar 67 and the record surface in a direction generally parallel to the longitudinal axis of the beam, and generally radially with respect to the axis of record rotation, and carries at the radially outer, free end thereof a lead slug 73. Slug 73 is provided with a recess in which probes 39 are mounted, and the slug weights the arm to apply a suitable downward force on the probes of about 0.5 gf on each probe.

Each of the probes 39 comprises a wire element, the tip part 41 of which is adapted to engage the record groove.

The mounting part 43 extends from the tip part and is held at the free end thereof in a plastics block 75 within the recess of slug 73. The two parts are mutually inclined at an angle of about 90° in an unstressed condition and at a slightly greater angle under the normal operating force of around 0.5 gf, and in the operative position the tip is inclined relatively to the record with respect to the direction of travel of the point of the record engaged by the probe tip at an acute angle of around 35° (see FIGS. 3 and 7) whilst the mounting part is in a trailing attitude.

The probes 39 are disposed approximately in line astern with respect to the direction of record rotation so that all the tips are engaged within the groove in a single turn of the spiral. With this arrangement, the probe tips lie on a curve the curvature of which is approximately the mean curvature of the spiral of the record trace. The distance between adjacent probes should be kept to a minimum to minimise the small misalignment resulting from the variation in the curvature of the trace at the beginning and at the end thereof. Alternatively, the probes could be disposed in line abreast so that the tips engage the turn of the spiral most closely adjacent the respective probe in each case. Instead of several probes, as shown, there could be only a pair of probes or a single one, although there might be some sacrifice of cleaning effectiveness. The in line astern arrangement is preferred to an arrangement of probes in line abreast because the variation of groove pitch particularly at interband locations on the record trace can result in temporary disengagement or bad misalignment of one or more of the probe tips from the record trace with the abreast arrangement. Also with the latter arrangement the probes will not track the run-in and run-out sections of the record trace.

Since the arm 35 is pivoted at the radially inner end thereof, the arm can oscillate perpendicular to the record surface as the probes encounter warps in the record surface thereby allowing for vertical movement of the probes relatively to the support means. Adjacent the pivoted end of the arm is a damper pad 76 which is fixed both to the arm and to the bar 67 of the slider, thereby damping oscillations of the arm relative to the slider and limiting the maximum extent of such oscillations. The arm is thus prevented from falling when the support beam is lowered, so that on lowering the probes are brought to rest on the record surface with the normal operating force of around 0.5 gf acting upon them, and the surface and probes are not damaged.

Each probe is formed from a single element of steel wire, for example 3.5 mm lengths of 75 $\mu$m wire bent to give a 0.5 mm tip part and a 3.0 mm mounting part. Such wire elements are rather delicate and cannot be roughly handled because if deflected beyond their elastic limits there is likely to be a permanent set. The plastic mount for the wires is surrounded on three sides by a housing 77 which constrains the extent of lateral and vertical deflection of the probe tips, relative to the fixed ends of the mounting parts, to be within the elastic limits of the steel elements. Housing 77 has a top 79 and two depending side walls 81 which extend beneath the level of lead slug 73 and have inwardly turned end portions 85, the edges of which limit lateral deflection of the probes and in the vertical direction a deflecting force is normally checked by the lower surfaces of the end portions so that the tips are pushed no higher once they are within the boundary of the housing.

If plastics, or plastics and wire, elements are used for the probes, such precautions to limit deflection need not be taken, but there are other disadvantages, mentioned later, as compared with wire probes. Nylon probes, for example, wear rapidly and cleaning efficiency is reduced.

Figure 4:
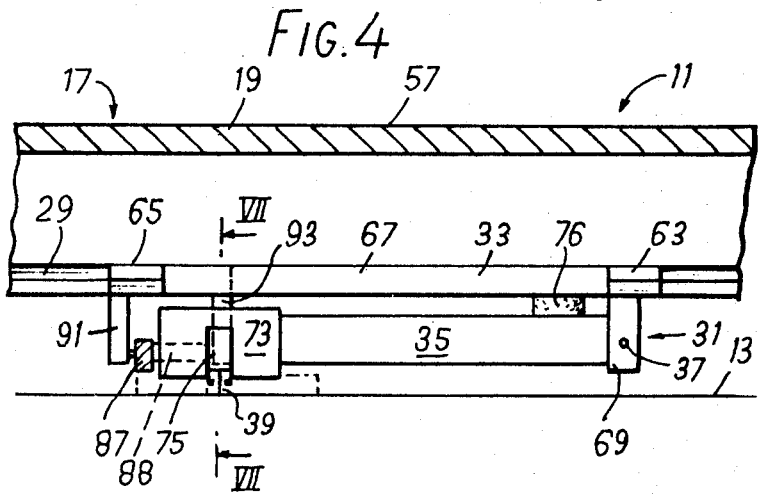

A second, subsidiary pivoted arm 87 is supported from the slider member of carrier 31 in a direction normal to the probe arm 35. This second arm has a cross bar 88 at one end thereof pivoted between two bearing mountings 91, 93 depending respectively from leg 65 of the slider adjacent groove 29 on the support member, and a lateral extension 66 thereof. The arm 87 extends in the direction of the other groove 27 and in the direction opposite to the direction of travel of a point on the record engaged by a probe tip. On the free end of the arm is an extension 95 directed radially inwardly and carrying on its under surface a pad 97 of pile fabric which, because of the pivot, rests on the record surface. The pad 97 can be used for dry-cleaning or wet-cleaning of the record surface as will hereinafter be described. For dry-cleaning the set-up is as shown in FIGS. 1 and 4, but for wet-cleaning there is provided additionally a liquid reservoir 99 charged with cleaning liquid 100, and a liquid feed tube 101 for dispensing liquid to pad 97. The reservoir is trough-shaped and is freely supported on the record surface to lie with its axis parallel to the beam 19. On the underside of the reservoir is a layer 103 of pile fabric which ensures substantially noiseless engagement during operation between the underside of the reservoir and the record trace. Two wings 105 and 107 project from the side of the reservoir facing the beam, and rotation of the record holds their ends in engagement with respective slots 109, 111 (see FIG. 1) to prevent movement of the reservoir in the radial direction. The reservoir 99 extends across the full width of the record trace and is provided with a partition wall 113 adjacent the outer end at a lower level relative to the surrounding walls, dividing an end compartment 115 from the main body 117 of the reservoir, in the floor of which compartment is provided a bleedhole 119 for liquid to be dispensed onto the outermost and run-in portion of the record groove. The liquid feed tube 101 is an inverted 'U'-shaped tube with a bore of diameter around 2 mm, having one end dipping into the liquid in the main body of the reservoir, whilst the other end engages as a pushfit an aperture 121 arranged radially of the probes in the extension 95 over the pad. The tube is provided with an internal wick of glass fibres and liquid is dispensed by capillary action to the pad and therefrom in a narrow band on the record trace in advance of the traverse of the trace by the probes.

The operation of the cleaning mechanism of FIGS. 1 to 8 will now be described. The mechanism is mounted on the baseboard and the vertical height of the clamp 47 is adjusted so that in the operative position the beam is horizontally disposed above the upper surface of the turntable 15. For placing a record on the turntable 15, the support member 17 is lifted to its 45° position. Member 33 of carrier 31 is slidably engaged in the channel of the support member, and the whole carrier, with pivoted arm 35 and also the second arm 87 carrying the pad 97, slides to a stop (not shown) near end portion 59 of beam 19. The stop is located so that when the beam is lowered into the operative position of the cleaning mechanism, the probes are positioned over the beginning of the record groove.

As the record rotates, the probes which are all engaged within the groove, track the groove, and the carrier which is made of material having a low coefficient of friction relatively to the support beam moves radially, along the longitudinal axis of the support beam, towards the centre of the record. The tips of the probes are so shaped that they make contact with the bottom of the groove, and the weighting of the lead slug applies pressure to the probes to enable them to lift particulate matter entrained within the groove. All the tips are aligned and inclined in a leading attitude with respect to the sense of record rotation as has been described above, with the result that while the record rotates the tips maintain a bulldozing action effective to raise noise inducing particles out of the groove. The acute angle of inclination of the tip relative to the record is selected to achieve efficent ejection of particles and also so that there is negligible pick-up by the cartridge stylus of shock-waves which may be generated by the probes. Shock waves are caused by a degree of mistracking of the probe tips due to vertical pinch effect, since these do not fit perfectly within the groove, coupled with high stiffness of the probes in the vertical direction. With the kind of probes shown in the drawings, arranged as shown, at an acute angle of about 35°, vertical stiffness is low, and the shock waves are virtually or completely inaudible on the speakers, whilst the cleaning efficiency is high. Mistracking in unlikely to occur, because the diameters of the metal tips 41 are of the order of the mean groove width and hence tracking and cleaning efficiency will not deteriorate as the tip wears. Moreover, whereas it is important for the ejection of particles lodged in the groove that the tips are at a leading angle to the direction of rotation, if the full length of the probes were so inclined, there would be a danger of the tips digging into and possibly damaging the record surface. Consequently, the probes are provided with mutually inclined parts, with the mounting parts in trailing attitude.

Plastics probe elements, such as nylon monofilaments, are not particularly suitable for a number of reasons. As mentioned above they are subject to rapid wear, and due to the low modulus of the plastic, their diameter has to be 6–8 times (250–300 $\mu$m) the average width of a groove to achieve the desired compliance.

To ensure that the tip of a plastic probe reaches the bottom of the groove, it has to be ground to a fine conical point, preferably with a 30°–40° included angle.

As the tip wears, it takes up the shape of the groove profile, i.e. a 90° included angle. With further wear, the stage is soon reached when the diameter of the conical section of the probe, level with the surface of the record, becomes greater than the width of the groove. At that stage, the lands on the record surface on either side of the groove begin to wear into the probe producing two horizontal flats at 180°. The area of these flats increases with further wear, and they support an increasing proportion of the downward forces applied to the probe, thus reducing the cleaning efficiency of the tip in the groove.

Another disadvantage of plastic probes is that in the line astern configuration, their increased diameter means that the pitch between probes has to be increased to maintain the desired acute angle to the record surface and, at the same time, sufficient clearance between probes. This increase in the length of the probe array poses serious tolerance problems. Alternatively, to minimise this problem the acute angle of the array can be increased, but this will greatly increase the likelihood of shock excited noise.

These remarks apply to all-plastic probes, but probes with plastic mounting parts and wire tips, or tips of other hard material such as diamond, sapphire or carbide, could alternatively be used.

With metal tips it is important to ensure that the forces exerted by the tips on the material of the record are insufficient to cause damage, and it is found that the tips can be suitably weighted by the lead slug to cause effective bulldozing action without detriment to the record grooves if the force on each tip is around 0.5 gf. The preferred weighting will depend on the material and dimensions of the probe elements, but 0.5 gf should normally be well within the range of safe values.

With probes formed of suitable material, reasonably good cleaning efficiency can be achieved with the probe tips inclined relative to the record at an acute angle of between 25° and 65°, and the preferred range for the angle of inclination is between 30° and 45°.

When the mechanism is used for dry cleaning of a record, the pad 97 engages a small area of the record surface on either side of the region just treated by passage under the probes. The pile on the pad is formed with a permanent set, for example by heat setting, to incline the pile at an acute angle with respect to the direction of travel of the region on the record at the location of contact thereof with the pile fabric, that is, at a leading angle in the same way as the probes, since this assists in the gathering and retaining of particles lying on the surface lands or ejected thereto by the probes. The weight applied to the pad by the assembly described above is low: of the order of 0.2 to 0.5 gf. This is sufficient to maintain reliable contact between the pad and the record surface. At the same time, it ensures that the frictional forces on the fibres are insufficient to deflect them significantly, so that they maintain their leading angle and hence their particle collecting efficiency.

Some of the extraneous particles within the record groove are not readily dislodged by the probes, even when these are inclined at a fairly steep angle, as some particles are firmly bonded to the surface for example by organic contaminants such as finger prints, or metal stearates employed as record release agents during manufacture. To remove such particles from a dry record surface would require an excessive amount of pressure acting on the probes, although they can be dislodged with the aid of a cleaning liquid. A suitable liquid applied to the record surface acts during a short time period to soften or partially dissolve bonding agents to an extent sufficient for the probes to lift the foreign matter out of the groove. The cartridge must not be in the playing position during wet cleaning of the record.

Methods of dispensing cleaning liquid onto the record surface will readily occur to those skilled in the art, but the method using the apparatus described above is simple and has certain advantages. The reservoir 99 which is fixed in relation to the rest of the mechanism is filled with cleaning liquid 100 to a level to allow a slight spill over the partition 113 into the outer end compartment 115. The small amount of liquid in this compartment drips through the hole 119 in the floor onto the run-in portion of the groove, which would not otherwise be adequately wetted as the wetted pad 97 does not extend radially outwards as far as the line of probes. Liquid in the body of the reservoir is dispensed by capillary action onto the pad 97 and from there onto a band on the record of the width of the pad. Since the pad extends radially inwards of the probes, there is time for softening or dissolving of the bonding agents before the probes reach that part of the groove. The cleaning liquid is absorbed largely by the pile fabric 103 on the underside of the reservoir and the liquid is of high volatility so that the residue evaporates from the record surface within about two or three minutes of being dispensed, leaving the surface unchanged in appearance. A suitable liquid is a combination of iso-propyl alcohol and water in approximately equal quantities. The wetted pad is also more efficient than the dry pad in collecting material ejected from the groove.

A single traversal of the record surface with cleaning liquid being dispensed will eliminate a substantial amount of background noise, although in particularly bad cases of contamination two runs may be required. For isolated "clicks" or localised noise the liquid can be directly applied to the affected area from a dispensing bottle. After this thorough cleaning, the cleaning mechanism can be used dry without the reservoir and 'U'-tube for all subsequent playings and a substantially quiet surface will be maintained.

In the embodiment of the invention illustrated in FIGS. 9 to 12, the probes depend from a carrier on one end of a pivoted offset arm, instead of from a radially movable carrier as in the embodiment described above. For like parts, the same reference numerals as before are used.

Figure 9:
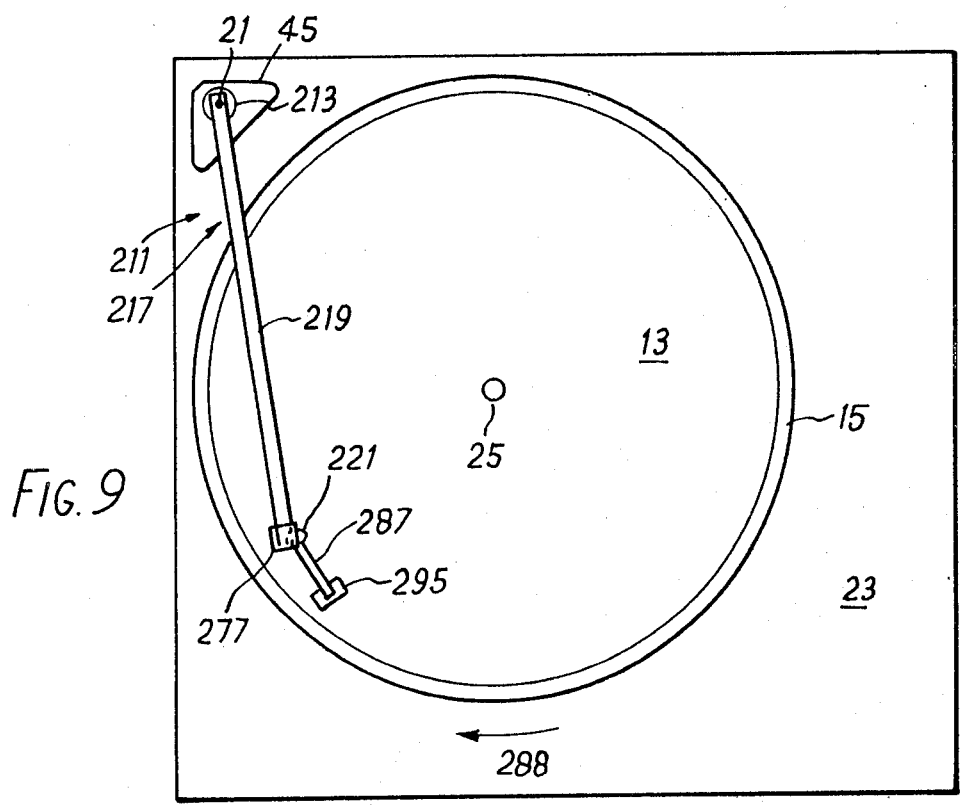
FIG. 9 is a plan view of a second embodiment of a cleaning mechanism according to the invention.
Figure 10:
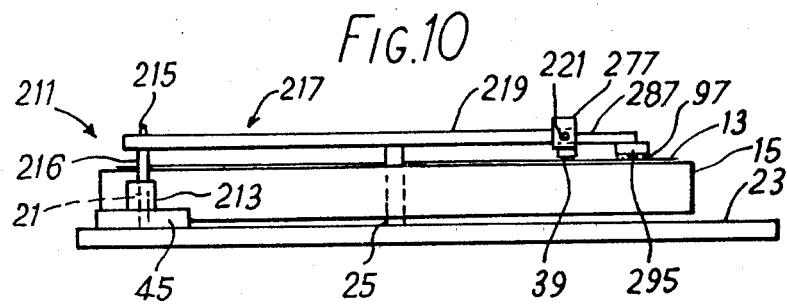
FIG. 10 is a side elevation of the mechanism of FIG. 9.
Figure 11:
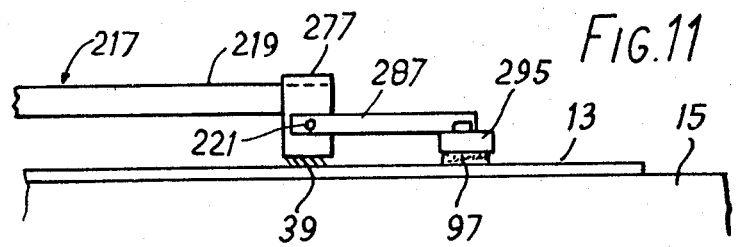
FIG. 11 is an enlarged view of part of the mechanism of FIGS. 9 and 10.

FIG. 9 shows a mechanism 211 for cleaning a record 13 on a turntable 15. There is a baseboard 23 on which the turntable is carried, the latter having an upright stud 25 at its centre. Fixed to the baseboard, outwardly from the periphery of the turntable is a triangular plate 45 with an upright cylindrical post 21 extending through a sleeve 213 fixed to the plate. The post has an upper section 215 of reduced diameter and a lower section 216 there being an annular bearing surface provided at the top of lower section 216 of the post 213. The height of the bearing surface above the turntable can be adjusted by suitable co-operating means (not shown) on the sleeve and post.

The cleaning mechanism includes support means 217 comprising an arm 219 having an aperture at one end thereof sized to fit over the upper section of the post 21 so that the arm rests on the bearing surface. At the opposite end of the arm is a carrier for probes 39 in the form of a plastics mount in a housing 277, similar to that described above for the first embodiment. The upper part of the housing has an aperture in which the end of the arm 219 is fixedly secured. The probes 39 are the same as described earlier, each having a mounting part and a tip part mutually inclined and directed so that the tip part is at an acute angle to maintain a bulldozing action. The probes are arranged in line astern, and the line of the probes is at an acute (i.e. "offset") angle to the axis of the arm so as to minimise tracking error (i.e. the angle between the plane in which a probe vibrates and the vertical plane containing the probe tip and the centre of the record disc, at stud 25). For the arrangement shown, the optimum offset angle is 25½°, and the centre of the probe array is disposed at a distance of 19 mm on the side of the turntable stud 25 remote from post 21 when the arm is directed radially towards the stud 25.

Arm 219 can rotate about the post 21 so that the probes 39 track the record groove inwardly from the margin of the record, and a small amount of up and down movement of the probe-carrying end of the arm is also possible so that the probes can ride over warps in the record surface withour losing contact. The material, position and dimensions of the arm 219 are selected to apply the appropriate downward force on the probes of approximately 0.5 gf for each probe. The arm illustrated is extruded nylon rod about 4.75 mm diameter and 216 mm long.

A subsidiary arm 287 is pivotally attached at one end thereof by a pin 221 to the probe carrier housing 277. The arm 287, as seen in FIG. 9, extends generally along the record groove and in a direction opposite to the direction of record rotation as indicated by arrow 288. At the free end of the arm is removably supported a pad carrier 295 having a pad 97 of pile fabric on its underside. As in the embodiment described above, because the arm 289 is pivoted to allow up and down movement, pad 97 rests on the record surface to pick up surface dust and other foreign matter brought to the surface by the action of the probes.

Figure 12:
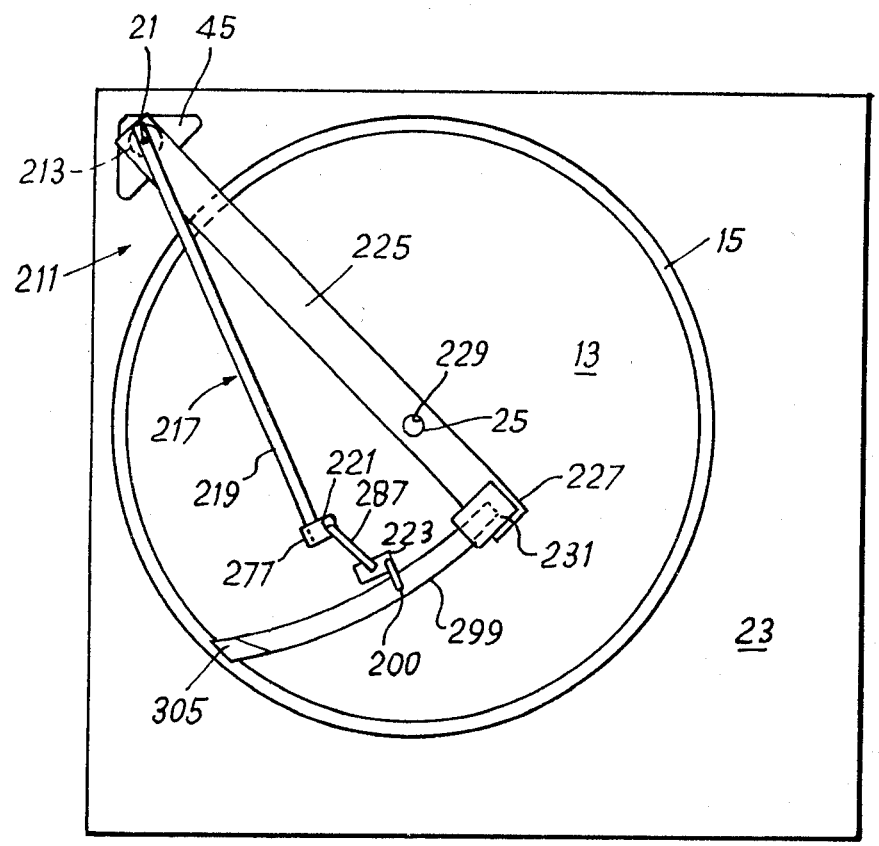
FIG. 12 is a plan view of the mechanism of FIGS. 9 to 11, including means for wet cleaning.

FIG. 12 shows an arrangement for wet cleaning. The pad 97 and pad carrier 295 are replaced by a tube carrier 223 with an inverted 'U'-shaped feed tube 200, one arm of which is attached to the carrier. A length of cotton fibre wick passes through the tube and one end of the wick extends about 10 mm below the tube carrier 223, is fanned out to form a pad and attached to the underside of the carrier with a minimal amount of adhesive. The other end of the tube 200 dips into a cleaning liquid in a reservoir 299. The reservoir is arcuate to permit the end of the 'U'-tube immersed therein to pass along its length as the probes track the record groove. As in the previous embodiment, there is an outer end compartment 305 to dispense liquid to the run in portion of the record groove, and the reservoir has a layer of pile fabric on its underside. Also, as before, the reservoir is located in advance of the probes so as to dispense liquid onto the record surface prior to the action of the probes in the record groove. The reservoir is held in position by a flat, radial, holding bar 225. The outer end of the bar rests on the bearing surface of post 21, the arm 219 resting on the upper surface of the bar. At an inner location towards the other end 227 of the bar is a hole 229 which fits over the upright stud 25 at the centre of the turntable. End 227 supports a plastics block 231, into which the inner end of the reservoir 299 plugs. The reservoir is thus held in position across the record at a level so that its lower surface rests on the record. However, since the reservoir is held at only one end, and the bar 225 can move up and down to a small extent, the reservoir can move up and down over a warped record surface.

The operation of the mechanism of FIGS. 9 to 12 will now be described insofar as it differs from that of the FIGS. 1 to 8 mechanism. Arm 219, with the carrier and probes at one end and subsidiary arm 287 and carrier 223 for dry cleaning, is fitted over post 21, which is adjusted for height, so that the arm 219 is horizontal when the probes rest on the record groove. As the record rotates the probes are moved generally towards the axis of record rotation as they track the record groove and they lift foreign particulate matter lodged in the bottom of the groove. This matter is subsequently picked up from the lands between adjacent turns of the groove by the pad 97 on the underside of pad carrier 295.

For wet cleaning of the record surface to remove the more embedded or bonded particles, arm 219 is removed from the post, and bar 225 located thereon and over the stud 25 at the centre of the turntable so that the reservoir rests on the record surface. The pad carrier is removed from the arm and replaced by the tube carrier 223 with the 'U'-tube 200. The arm 219 is then replaced, so that the free end of the 'U'-tube extends into the reservoir 299. The reservoir is filled with cleaning liquid which is drawn through the wick in the tube 200 and dispensed to the record surface from the pad formed by the fanned out end of the wick which rests on the record surface.

The probes 39 are initially in the run-in portion of the groove, but as the record rotates they follow their curved path towards the bar 225. Subsidiary arm 287, carrier 223 and tube 200 move with the arm, and the end of the tube immersed in the cleaning liquid passes along the length of the reservoir 299 which lies parallel to the loci of the probe tips.

Those skilled in the art will appreciate that changes may be made to the embodiments illustrated and described without departing from the scope of the invention.

For example, in the first embodiment, arm 35 could be pivoted at the radially outer end thereof, but then the support post 21 for the beam would need to be spaced a distance from the turntable so that the probes on the inner end of the arm could be engaged in the radially outer end of the record groove; in some circumstances this would not be practicable from the point of view of space consideration.

Moreover, the means for wet cleaning could be replaced by a tube carrier, tube and wick similar to that described for the second embodiment, or by any other suitable means.

In the second embodiment, the offset arm 219 could if convenient be replaced by a similar arm attached to the baseboard so that the arm lies in a trailing, rather than a leading, attitude, in which a point on the record passing under a probe tip at one end of the arm is travelling in a direction generally away from the other end of the arm. In this case the direction of the probes, and the pile inclination of an appended dry cleaning pad, would be reversed so as to maintain the bulldozing action of the probe tips and pad.

There is also scope for variations, in each case, of the construction of the support means, the probe carrier and the probes.

I claim:

1. Cleaning mechanism for phonograph disc records, comprising a carrier, support means for positioning the carrier over a disc record groove when the latter is in operative location on a turntable and adapted to enable movement of the carrier in said operative location of the record in a direction generally towards the axis of rotation of the record, and a probe mounted on the carrier, said probe being a unitary element and generally rod-like and having a relatively stiff, hard wearing tip part which engages within the record groove at or substantially at the bottom of the groove, and a mounting part substantially longer than the tip part, extending from the tip part and supported on the carrier at a location remote from the tip part so as to impart flexibility to the mounting part, the mounting part and the tip part being mutually inclined so that, in operation, the mounting part is in a trailing attitude whilst the tip part is inclined at an acute angle relatively to the record with respect to the direction of travel of the point on the record engaged by the tip part, so as to maintain during rotation of the record a bulldozing action by the tip part to raise noise inducing particles out of the record groove, whilst the mounting part, through flexure thereof, enables the tip part to surmount obstructions in the groove.

2. Cleaning mechanism as claimed in claim 1, wherein the tip part is inclined relatively to the record in the direction of travel thereof at the point of contact with the probe at an acute angle in the range of 25° to 65°.

3. Cleaning mechanism as claimed in claim 2, wherein the acute angle is in the range of 30° to 45°.

4. Cleaning mechanism as claimed in any one of claims 1, 2 or 3, wherein there are provided a plurality of probes mounted on the carrier and disposed in or approximately in line astern with respect to the direction of record rotation.

5. Cleaning mechanism as claimed in claim 1, wherein said probe comprises a wire element.

6. Cleaning mechanism as claimed in claim 1, wherein the mounting and tip parts are mutually inclined at an angle of or approximately of 90°.

7. Cleaning mechanism as claimed in claim 5, wherein said probe is protected by means constraining lateral and vertical deflection of said probe tip part relative to the carrier to be within the elastic limits of the unitary element.

8. Cleaning mechanism as claimed in claim 1, wherein pivotally supported from the carrier so as to engage the record after passage thereof under said probe is a pad of pile fabric.

9. Cleaning mechanism as claimed in claim 8, wherein a subsidiary arm is pivotally supported from the carrier, said arm being adapted to carry, at the free end thereof, the pad of pile fabric.

10. Cleaning mechanism as claimed in claim 9, comprising dispensing means to pass liquid to the pad from a liquid reservoir.

11. Cleaning mechanism as claimed in claim 1, wherein the carrier comprises a member slidable in said generally radial direction relative to the axis of record rotation and an arm pivotally supported at one end thereof from said member, the pivoted arm being disposed with its longitudinal axis extending generally radially with respect to said axis of rotation and with said probe mounted at the free end thereof.

12. Cleaning mechanism as claimed claim 1, wherein the support means comprises a beam pivotally mounted at an outer end thereof on a post carried on a baseboard of the turntable, the inner end of the beam being supported in operation on an upright stud at the centre of the turntable.

13. Cleaning mechanism as claimed in claim 1, wherein the support means comprises an arm having one end bearing the carrier and the other end pivotally supported in relation to a baseboard of the turntable, for movement of the free end of the arm parallel with the record surface.

14. Cleaning mechanism as claimed in claim 13, wherein the arm is disposed, in operation, in a leading attitude so that a point on the record passing under said tip part at one end of the arm is travelling in a direction generally towards the other end of the arm.

15. Cleaning mechanism as claimed in claim 14, wherein a plurality of probes are arranged in a line astern with said line lying at an acute angle to the line through the two ends of the arm so as to reduce the tracking error.

16. Cleaning mechanism as claimed in claim 1, wherein there is provided a plurality of probes mounted on the carrier and disposed in or approximately in line abreast with respect to the direction of record rotation.

17. Cleaning mechanism as claimed in claim 12, comprising a pad of pile fabric pivotally supported from the carrier so as to engage the record after passage thereof under said probe, and dispensing means to pass liquid to the pad from a liquid reservoir, wherein the liquid reservoir is freely supported on the record surface and urged during rotation of the record against the beam.

18. Cleaning mechanism as claimed in claim 13, comprising a subsidiary arm pivotally supported from the carrier to extend in the direction generally opposite to the direction of travel of a point on the record engaged by said probe tip, said arm being adapted to carry, at the free end thereof, liquid dispensing means comprising a pad, adapted to receive, at the side thereof facing the record surface, liquid from a reservoir and a holder for the reservoir, the reservoir being attached to the holder so as to lie across the record surface to permit the carrier to move alongside the reservoir during cleaning of the record.

19. Cleaning mechanism as claimed in claim 1, wherein said probe comprises steel wire of about 75 μm size bent to produce a tip part about 0.5 mm long and a mounting part about 3.0 mm long.

20. Cleaning mechanism as claimed in claim 1, including a subsidiary arm pivotally supported from the carrier to extend in the direction generally opposite to the direction of travel of a point on the record engaged by said tip part, said arm being adapted to carry, at the free end thereof, liquid dispensing means comprising a pad, adapted to receive, at the side thereof facing the record surface, liquid from a reservoir.

* * * * *